June 28, 1966 C. C. PATTERSON ET AL 3,258,568

DISCHARGE FILTER FOR CIRCUIT INTERRUPTER

Original Filed Nov. 20, 1962 4 Sheets-Sheet 1

WITNESSES:

Bernard R. Giegucz

James T. Young

INVENTORS
Calvin C. Patterson and
Russell E. Frink.

BY

Willard R. Crout

ATTORNEY

June 28, 1966 C. C. PATTERSON ET AL 3,258,568

DISCHARGE FILTER FOR CIRCUIT INTERRUPTER

Original Filed Nov. 20, 1962 4 Sheets-Sheet 2

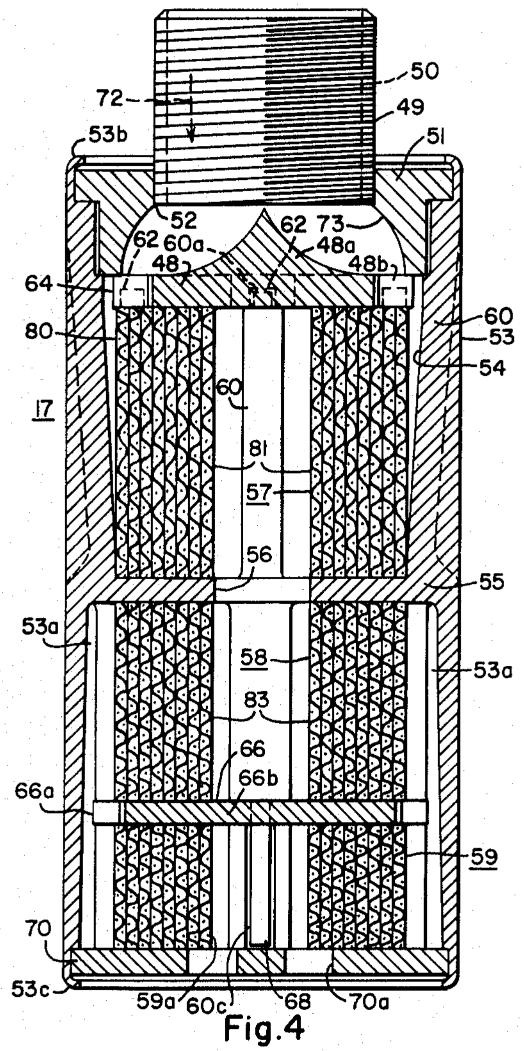
Fig.4
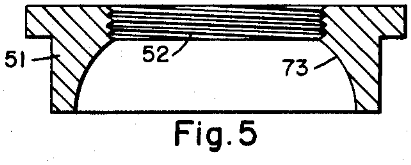
Fig.5
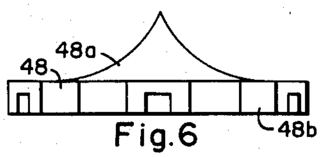
Fig.6
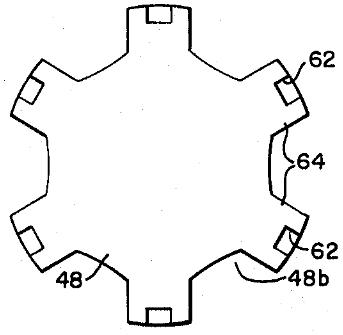
Fig.7
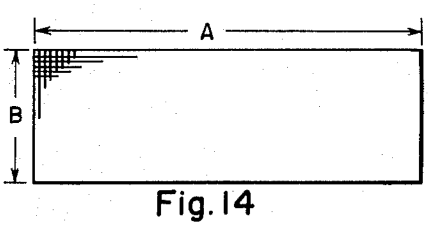
Fig.14
Fig.16
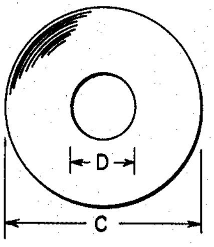
Fig.15
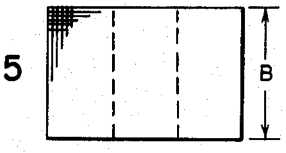
| ITEM | DIMENSIONS (INCHES) | | | |
|---|---|---|---|---|
| | A | B | C | D |
| 57 | 30 | 2 3/4 | 3 | 1 |
| 58 | 80 | 2 | 3 | 1 |
| 59 | 135 | 1 1/4 | 3 | 1 |
Fig.17

DISCHARGE FILTER FOR CIRCUIT INTERRUPTER

Original Filed Nov. 20, 1962 4 Sheets-Sheet 4

United States Patent Office 3,258,568

Patented June 28, 1966

3,258,568

DISCHARGE FILTER FOR CIRCUIT INTERRUPTER

Calvin C. Patterson, White Oak, and Russell E. Frink, Forest Hills, Pa., assignors to Westinghouse Electric Corporation, Pittsburgh, Pa., a corporation of Pennsylvania Continuation of application Ser. No. 238,871, Nov. 20, 1962. This application Apr. 26, 1965, Ser. No. 453,548
15 Claims. (Cl. 200—144)

This is a continuation of application Serial No. 238,871, filed November 20, 1962, and now abandoned, which is assigned to the same assignee as the present application.

This invention relates to circuit interrupters in general and, more particularly, to expulsion-type circuit interrupting devices, wherein the arc is drawn along a restricted passage having a material evolving gas, and wherein a cooling condenser, muffler or discharge filter is positioned over the end of the arc passage to receive and to cool the gases given off during arc interruption.

This invention is an improvement over the filter construction set forth in United States patent application filed April 30, 1958, Serial No. 731,916, by Calvin C. Patterson, entitled "Circuit Interrupter," and assigned to the assignee of the instant application, which issued April 13, 1965, as U.S. Patent 3,178,537.

In the application of expulsion-type power fuses, for example, it is often necessary to enclose the fuse mounting inside of a cubicle or other enclosing structure. Since in normal operation there is expelled from the lower end of the power fuse a large amount of incandescent or ionized gas, which, if allowed to escape freely, might result in a flashover, it is usual to equip such inside-mounted fuse holders with condensers or discharge filters.

These discharge filters are attached to the lower end of boric-acid type power fuses, for example, and allow only the relatively deionized gas to escape into the space where flashovers are possible. With the use of such discharge filters, there is no visible display at the time of operation, since the incandescent gases resulting from decomposition of the boric acid are condensed to vapor form. Thus, the possibility of flashover is eliminated by the use of such a discharge filter.

One disadvantage to the use of the aforesaid discharge filter, as known to the art, is the derating with respect to interrupting ability which accompanies their application. This derating amounts to approximately ¼ to ⅓; that is, with a discharge filterd attached to the lower end of the fuse holder, it may be used on a system having only ⅔ or ¾ of the short-circuit capacity of one on which the vented-type holder is employed.

The present invention is concerned with a discharge filter which can be used on existing-type circuit interrupters, or with existing fuse holders and mountings, and provides a means for condensing the incandenscent gases, with sufficient relief of the internal back pressure to allow the combination of discharge filter and fuse holder to be used at the full interrupting capacity of the vented-type fuse holder. Thus, there need be no derating.

Accordingly, it is a general object of the present invention to provide an improved circuit interrupter employing an improved discharge filter to highly effectively permit the exhausting of the arc gases without back pressure, and at the same time effect a substantially complete deionization of the arc gases, so that there will not be the possibility of flashover to adjacently disposed housing structures.

Another object of the present invention is to provide an improved discharge filter, which will be so effective that there will be no derating of the fuse holder in its application.

Yet a further object of the present invention is the provision of an improved discharge filter employing rolls of screening with a progressively decreased gauge and a cooperating baffle construction, so supported, as to effectively bring about the substantially complete deionization of exhausted arc gases, while at the same time preventing any possibility of collapse of such screening, which, if allowed to occur, would act as a solid impeding block to the exhaust-gas flow.

An ancillary object of the present invention is the provision of an improved discharge filter for a fuse structure, in which baffle-plate structure of particular configuration is employed between consecutively-arranged rolls of screening, such that a relatively long tortuous path is provided for the gas flow to completely bring about the deionization and cooling of incandescant exhaust arc gases.

A further object of the present invention is the provision of an improved circuit interrupter employing a discharge filter of very small compact size, which is highly effective in bringing about the deionization of exhaust arc gases during circuit interruption, thereby permitting relatively close spacing between such circuit interrupting devces and a surrounding enclosing housing.

Still a further object of the present invention is to provide an improved discharge filter having a deflecting plate structure, interposed in the path of the entering exhaust gases, and preferably of sufficient mass to serve a heat-absorbing function.

Still a further object of the present invention is the provision of an improved discharge filter of generally tubular configuration and having body-wall portions with a tapered internal surface to effectively direct the exhaust gases in a desired manner.

Still a further object of the present invention is the the provision of an improved discharge filter having a casing body with integrally-formed support legs and adapted to cooperate with readily-insertable items to effect a rapid assembly of the discharge filter.

Still a further object of the present invention is the provision of an improved discharge filter having the body portion formed of a casting metal, and preferably having external integrally-formed ribs for facilitating assembly of the device.

Yet a further object of the invention is the provision of an improved discharge filter in which the exhaust gases are preferably directed in a radial inward path through the screening, as contrasted with a longitudinal flow between the layers of screening. Preferably, such a path includes a prior impact of the exhaust gases on the inner surface the outer filter body for a maximum absorption of heat.

Another object of the present invention is the provision of an improved discharge filter having a plurality of heat-absorbing screening sections in which the gas flow is directed in a uniformly-distributed path through the screening.

Another object of the invention is the provision of an improved discharge filter functioning in a manner so as to employ screening of reduced gauge as the temperature of the exhaust gases is lowered.

An ancillary object of the present invention is the provision of an improved discharge filter in which the effective cross-sectional area of the passage flow is reduced as the exhaust gases are cooled in their passage through such discharge filter.

Still a further object of the present invention is the provision of an improved discharge filter in which an internal supporting structure is so configured and arranged as to facilitate the assembly of the screening sections and baffle plates therein.

Further objects and advantages will readily become apparent upon reading the following specification, taken in conjunction with the drawings, in which:

FIG. 4 is an enlarged side elevational view, partially in vertical section, of the improved discharge filter of the present invention;

FIG. 5 is a vertical sectional view through the deflector holder element of the improved discharge filter;

FIGS. 6 and 7 are respectively side elevational and plan views of the deflector baffle plate of the discharge filter;

FIGS. 14–16 collectively illustrate the manner of assembling of the screening sections; and, FIG. 17 illustrates in tabular form the screening dimensions for a particular rating.

Figure 1:
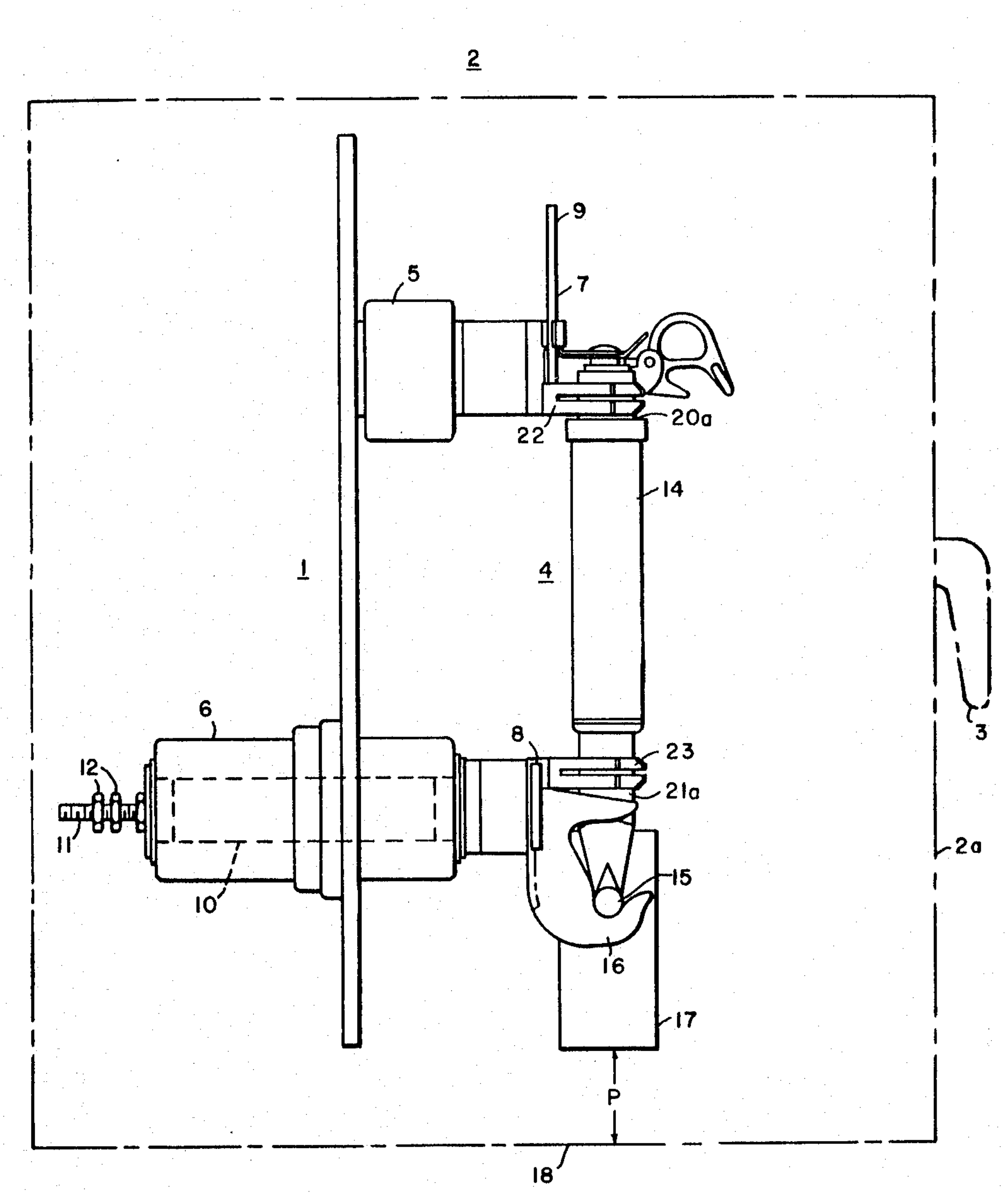
FIGURE 1 is a side elevational view of a circuit-interrupting device embodying the principles of the present invention, and located within an enclosing cubicle housing.

Referring to the drawings, and more particularly to FIG. 1 thereof, the reference numeral 1 generally designates a circuit-interrupting device enclosed within a surrounding cubicle structure 2. Preferably, the cubicle housing 2 has a handle 3 for opening and closing a door 2*a*, so that a station attendant may inspect the condition of the circuit-interrupting device 1.

In this particular form of the invention, the circuit-interrupting device 1 assumes the form of a fuse structure 4 including insulator supports 5, 6, in turn supporting relatively stationary contact structures 7, 8.

The stationary contact structure 7 may include a line terminal plate portion 9, to which a line connection may be made. The stationary contact structure 8, in this instance, has a stud portion 10 extending interiorly through the support insulator 6 and terminating at a threaded line-terminal stud 11, having nuts 12 thereabout, to which a second line connection may be made.

As well known by those skilled in the art, the fuse structure 4 will provide desired short-circuit protection; and, in addition, by the employment of a suitable hook-stick, a station attendant may effect the rotation of the fuse holder 14 about the trunnion pins 15 positioned in the stationary contact jaws 16 to effect thereby disconnection of the controlled circuit.

It will be observed that only a relatively small spacing, designated by the distance P, exists between a condenser, or muffler 17, associated with the lower end of the fuse holder 14, and the bottom wall 18 of the cubicle housing 2. This spacing is relatively close, since, as well known by those skilled in the art, generally adjacently-disposed apparatus is employed in conjunction with the circuit-interrupting device 1, and consequently, invariably, space is at a premium. Thus, the demands of the industry are such that the spacing distance P is relatively small.

According to the present invention, there is provided a condenser, or muffler 17 associated with the fuse holder 14, such that complete deionization of the exhaust arc gases is effected, and yet no detrimental back pressure is permitted to form, to interfere with proper expulsion action of the fuse device 4.

Figure 2:
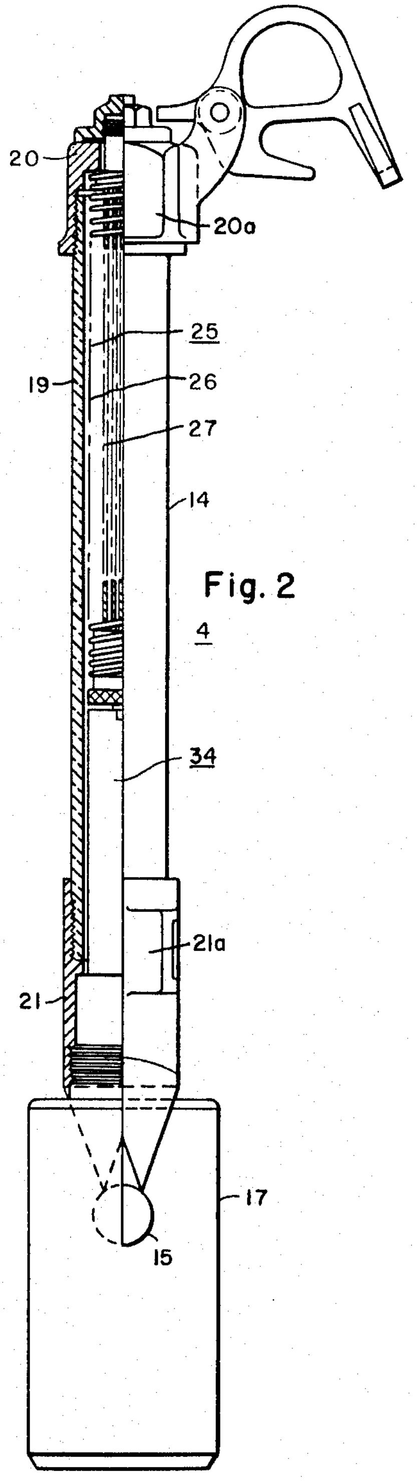
FIG. 2 is an enlarged side elevational view, in quarter section, of the fuse holder utilized in the circuit-interrupting device of FIG. 1.

FIG. 2 more clearly shows the internal construction of the fuse holder 14. It will be observed that there is provided a fiber fuse tube 19 having terminal ferrules 20 and

21 threadedly secured to its upper and lower ends. The upper terminal ferrule 20 has a side contact portion 20*a* (FIG. 1), which makes sliding contact with fuse clips 22, supported at the upper stationary contact 7 of the interrupting device 1.

The lower fuse terminal ferrule 21 also has a side contact portion 21*a*, which makes contact with a lower set of fuse clips 23 (FIG. 1) in the closed-circuit position of the device.

Figure 3:
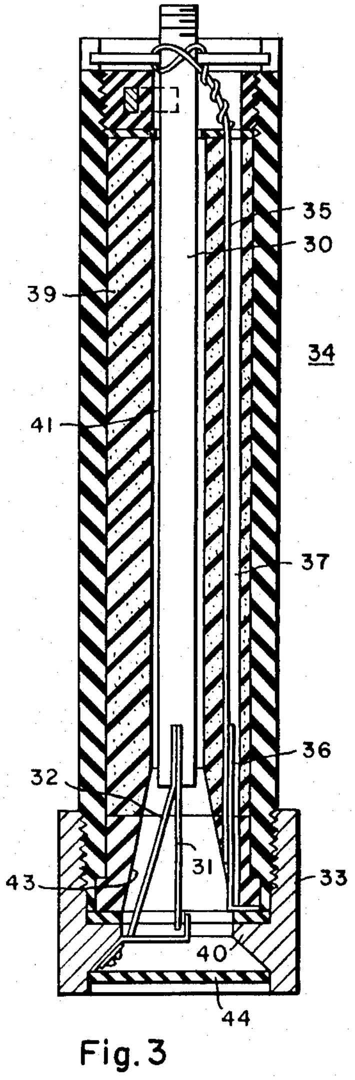
FIG. 3 is a vertical sectional view through the fuse-refill element employed in the fuse holder of FIG. 2, the fuse elements being in ther intact unfused condition.

Disposed interiorly within the fiber fuse tube 19 is a spring assembly 25 including a tension spring 26 and a plurality of flexible connectors 27. As shown more clearly in FIG. 3, the tension spring 26 biases a contact rod 30 upwardly to the open-circuit position. The lower end of the contact rod 30 has affixed thereto a fuse link 31 and a strain wire 32, which are connected to the lower ferrule 33 of the fuse-refill unit 34. In addition, an auxiliary fuse wire 35 movable with the contact rod 30 engages a relatively stationary wire 36 within an auxiliary fuse passage 37 for a purpose explained hereinafter.

Surrounding the movable contact rod 30 is a molded hollow cylinder of boric acid 39. During the opening operation, the arc, which is established between the lower end of the movable contact rod 30 and the interior portion 40 of the fuse ferrule 33 of refill unit 34, is drawn upwardly through the restricted arcing passage 41 provided by the boric-acid liner 39. This causes the formation of boric oxide ($B_2O_3$) and evolution of water vapor, which is expelled downwardly through the open end 43 of the fuse passage 41, displacing a loosely-positioned plate 44. During fuse operation, the disc 44 vaporizes.

As more fully set out in United States Patent 2,590,524, issued March 25, 1952, to Andrew W. Edwards, and assigned to the assignee of the instant application, during the interruption of high-current arcs, the interrupting action takes place within the large bore 41 of boric-acid liner 39, since, although the auxiliary fuse wire 35 separates last from the stationary wire 36, the high arc voltage compels a transfer to the main bore 41 of the fuse refill unit 34. During the interruption of relatively low overload currents, since the fuse wire 35 separates last from the fuse wire 36, arc establishment and arc extinction occurs only within the smaller auxiliary arc passage 37.

It will be apparent that the spring assembly 25 rapidly draws the movable contact rod 30 upwardly during the opening operation to bring about very rapid arc lengthening. It will also be obvious that during the interruption operation, particularly for heavy-current short-circuit conditions, that a considerable volume of incandescent and ionized exhaust gas will be projected downwardly through the open end 43 of the fuse passage 41. To effect the condensation and deionization of such exhaust arc gases, as well as to prevent external flame emission, and, in addition, to bring about noiseless interruption, it is desirable to provide a condenser, or muffler attachment 17 associated with the lower end of the fuse holder 14.

FIG. 4 more clearly shows the internal construction of the improved discharge filter 17. Briefly, the discharge filter 17 includes a threaded nipple 49 having a cylindrical passage 50 extending therethrough. The discharge nipple 49 is fixedly secured to an annular deflector support 51 by any suitable means, as by a threaded connection 52.

Figure 9:
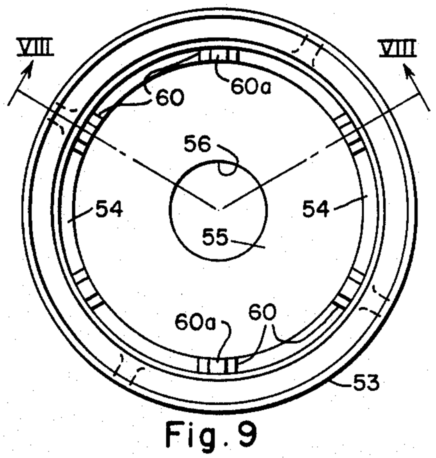
FIGS. 9 and 10 are end elevational views of the filter body of FIG. 8.
Figure 10:
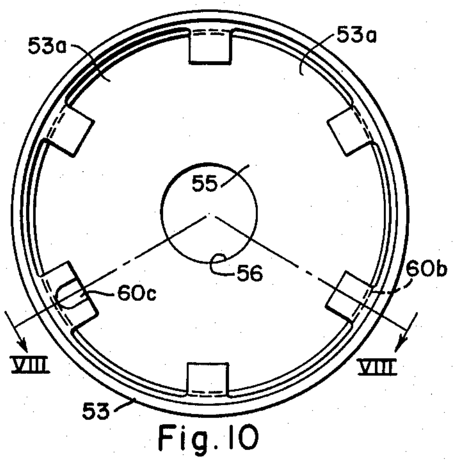
Figure 8:
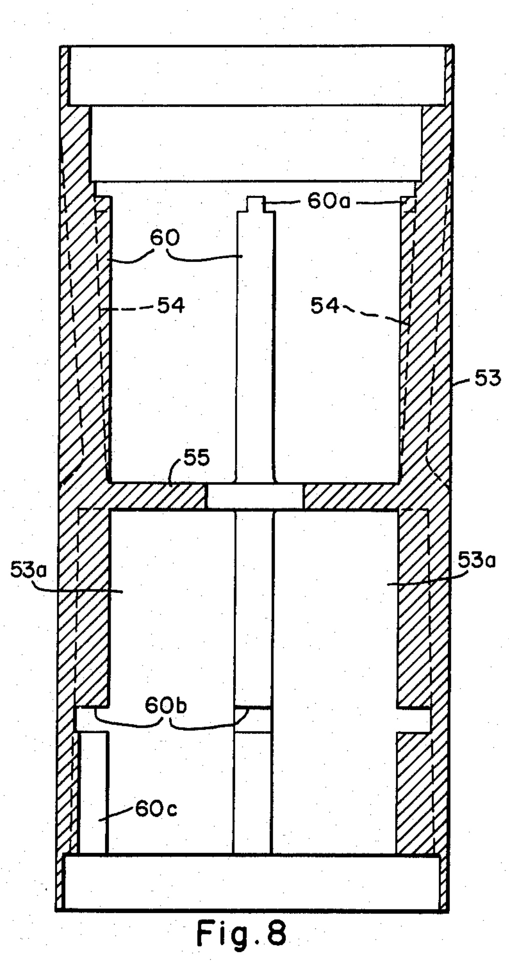
FIG. 8 is a vertical sectional view taken through the filter body.
Figure 11:
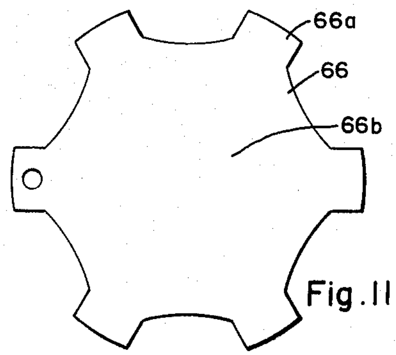
FIGS. 11 and 12 are respectively top-plan and side elevational views of a baffle plate employed in the improved filter assembly.
Figure 12:
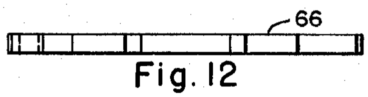

The deflector support 51 is inserted within a filter body 53 having a configuration more clearly shown in FIGS. 8–10 of the drawings. It will be observed that the filter body 53 has an interior surface 54 which tapers inwardly to terminate upon a radially inwardly-extending flange portion 55 having an aperture 56 provided therein. In effect, the flange portion 55 constitutes a partition plate which separates the first screening section 57 from the screening sections 58, 59 disposed adjacent the lower end of the discharge filter 17, as viewed in FIG. 4.

Preferably, the filter body 53 has inwardly-extending integrally-formed leg portions 60 more clearly shown in FIG. 8 of the drawings. Each leg portion 60 has an upwardly-extending lug 60*a*, which fits into a recess 62 (FIG. 7) provided in each of the outwardly-extending legs 64 of the deflector element 48.

During the assembly operation, the first screening section 57 is inserted into the upper end of the filter casing 53. Then the heat-absorbing deflector member 48 is inserted into the upper end of the filter casing 53 so that the recesses 62 on the legs 64 of the deflector element 48 are positioned upon the lugs 60*a* of the support legs 60 to maintain the deflector element 48 in a proper relatively fixed position. Subsequently the sub-assembly of the nipple 49 and attached deflector support 51 are inserted, as a unit, into the upper extremity of the filter casing 53. The entire device is then reversed into position, for further assembly operations, so that the nipple 49 rests downwardly upon a support table.

Subsequently, the second screening section 58 is inserted downwardly into the inverted filter casing 53 so that it rests upon the partition plate 55. The "star-shaped" deflector plate 66 is then inserted into the filter casing 53 so that the leg portion 66*a* thereof extend within the recesses 53*a* of the filter casing 53. As noted in FIG. 8, the support legs 60 have recesses 60*b* which accommodate the outwardly extending leg portions 66*a* of the deflector plate 66 when the latter is placed into a proper position. To fixedly maintain the deflector plate 66 into its proper position, a positioning pin 68 is extended along a longitudinally-extending slot 60*c* (FIG. 8) and into a hole 66*b* of the deflector plate 66, and maintained therein by a frictional engagement. Such an operation insures that the deflector plate 66 will be positively maintained within the recesses 60*b* and will maintain the second screening section 58 into a proper relatively fixed position.

Figure 13:
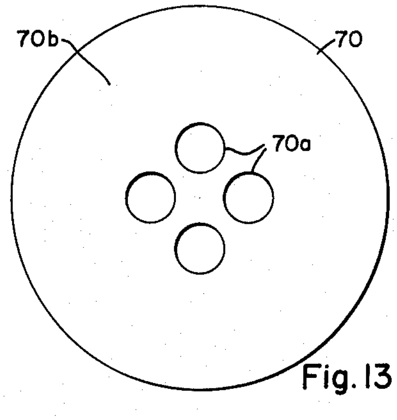
FIG. 13 is a plan view of the end closure plate of the filter assembly.

Subsequently, the third screening section 59 is positioned at the upper end of the inverted filter casing 53; and finally, the end closure plate 70, shown in FIG. 13, is positioned in contiguous relation with the third screening section 59. As a final operation, the ends 53*b*, 53*c* are crimped over the deflector elements 51, 70, respectively.

The operation of the improved discharge filter 17 will now be described. As viewed in FIG. 4, the discharge gases from the fuse element pass downwardly, as indicated by the arrow 72. The discharge gases strike the cone-shaped portion 48*a* of the deflector element 48 and are deflected upwardly to strike the bowl-shaped surface area 73 of the deflector support 51. This not only deflects the exhaust gases to cause them to assume a somewhat swirling path, but also, more importantly, extracts a considerable amount of heat from the exhaust gases, which is absorbed by the mass of the deflector element 48 and deflector support 51. A very important function of the deflector element 48 is to direct the downwardly-ejecting exhaust gases radially outwardly against the deflector support 51, and hence through the openings 48*b* along the inner surface of the filter casing 53 to enable the latter to extract more heat therefrom. In addition, the tapered walls of the upper portion of the filter casing 53, as viewed in FIG. 4, cause the downwardly-passing exhaust gases to successively deflect along the inner walls of the casing body 53 to uniformly strike the external area 80 of the first filter section 57 to thereby distribute the heat-absorbing effect therein.

The exhaust gases, in passing radially inwardly into the bore portion 81 of the first filter section 57, are then diverted downwardly to pass through the opening 56 of the partition plate portion, and are then ejected downwardly, as viewed in FIG. 4, to strike the deflector plate 66 adjacent the central portion 66*b* thereof. The deflection of the exhaust gases at this point insures that the latter will be again substantially uniformly distributed over the inner bore 83 of the second screening section 58 to again be substantially uniformly directed radially outwardly through the second screening section 58.

After passing radially outwardly through the second screening section 58, the gases will be deflected by the inner wall 53*c* and pass downwardly through the opening 66*b* of the lower deflector plate 66. The downward movement of the exhaust gases will be halted at the surface portion 70*b* of the closure plate 70, and will again be deflected radially inwardly through the third screening section 59 to pass through the central bore 59*a* thereof. Finally, the exhaust gases will pass downwardly through the holes 70*a* of the lower closure plate 70 to be ejected from the filter element 17 in a somewhat concentrated blast, so that the clearance between the exhaust gases of adjacent phases will be increased.

From the foregoing it will be noted that the passage of the exhaust gases is accompanied by a considerable heat-absorbing action of the deflector plate 48, as well as by the inner walls of the casing body 53. In addition, the three screening sections 57–59 have the gases substantially uniformly passed therethrough. The screening sections 57–59 are the primary source of the heat-absorbing function of the filter element 17 because of the high heat conductivity of the copper mesh screening.

It is to be noted that a heavier gauge copper screening is employed in the first screening section 57 than in the screening sections 58, 59. For one particular rating, the first section of screening consists of 4 mesh .105 inch diameter copper screen, whereas the second screening section 58 consists of 5 copper mesh of .054 inch diameter, with the third screening section 59 having a wire diameter .032 inch and being of 8 mesh copper screening.

From the foregoing it will be noted that the improved filter element 17 utilizes screening of different gauge according to the passage of the exhaust gases, that is, a heavier gauge being used in the first screening section 57. In addition, the deflector plate 48 absorbs heat and also directs the exhaust gases along the inner surface of the filter casing 53. The tapered body portion of the filter casing 53 insures a substantially uniform dispersion of the exhaust gases consecutively through the several screening sections, and the reduction of the temperature of the exhaust gases is accompanied by a reduction in the effective cross-sectional area of the several passage openings within the filter element 17.

A very important commercial application of the improved discharge filter 17 of the present invention is the application to the type "DFS" metal-clad switchgear having a voltage rating of 4160 three phase with an interrupting rating of 250 mva. For such a rating the table of FIG. 17 indicates the dimensions in inches for fabricating the several screening sections 57–59. In such equipment, the rated interrupting current is 56,000 amperes, but, in fact, the improved discharge filter 17 of the present invention has successfully interrupted more than 62,000 amperes total R.M.S. asymmetrical amperes in the laboratory. The improved discharge filter 17 deionizes the exhaust gases to such a considerable extent as to enable building equipment to considerably reduced dimensions than heretofore possible. Another very important commercial advantage of the use of the present invention is the fact that when it is desired to utilize auxiliary equipment in close proximity to the fuse structures, using the improved filter element 17 of the present invention, very short clearance distances may be employed without danger of establishing an arc to ground.

Although there has been illustrated and described a specific structure, it is to be clearly understood that the same was merely for the purpose of illustration, and that changes and modifications may readily be made therein without departing from the spirit and scope of the invention.

We claim as our invention:

1. A circuit interrupter including means for establishing an arc, a discharge filter chamber for receiving the exhaust arc gases and for cooling and deionizing the same, said discharge filter chamber having a main body portion and a flow-directing nozzle at the inlet end thereof, an apertured deflector member disposed adjacent the inlet end of the filter chamber, and said apertured deflector member having a central cone-shaped deflecting portion pointed upstream of said flow-directing nozzle and a plurality of spaced apertures disposed only around the outer periphery of said deflector member, a nozzle support secured to said flow-directing nozzle and having an inner surface of bowl-shaped configuration, said nozzle support being interposed between said nozzle and the apertured deflector member, whereby the axially-directed exhaust gases entering the filter chamber through said flow-directing nozzle will be diverted outwardly and will thereby be prevented from blasting axially along the filter chamber.

2. The combination according to claim 1, wherein heat-absorbing screening means is positioned within the discharge filter chamber within the main body portion thereof.

3. In combination, a discharge filter for the exhaust gases from a circuit interrupter including a hollow cylindrical casing member having an integrally-formed apertured partition-plate portion intermediate the ends of the casing, screening means having one side disposed in contiguous relation to one side of said partition-plate portion for support, and inlet nozzle means on the other side of said screening means for directing the exhaust gases into the discharge filter, the inner surface walls of said casing adjacent the screening means being converging to gradually reduce the cross-sectional area of the space inside said casing in a direction toward said partition-plate to deflect the exhaust gases into said screening means.

4. A circuit interrupter including means for establishing an arc, a discharge filter chamber for receiving the exhaust arc gases and for cooling and deionizing the same, said discharge filter chamber comprising a cylindrical casing having a flow-directing nozzle at the inlet end thereof, longitudinally extending support ribs integrally formed with said casing and extending along the casing adjacent the outlet end thereof, an apertured deflector member disposed adjacent the inlet end of the filter chamber, said apertured deflector member having a cone-shaped deflecting portion pointed upstream of said flow-directing nozzle, said casing having a partition-plate portion with a central aperture therethrough intermediate the ends of the casing, first screening means disposed between said partition-plate portion and said deflector member, additional screening means disposed adjacent the exhaust end of the casing, and a star-shaped support member adaptable for insertion between the support legs and supported in recessed portions of said support legs.

5. The combination in claim 4, wherein a nozzle support secured to said flow-directing nozzle and having an inner surface of bowl-shaped configuration, said nozzle support being interposed between said nozzle and the apertured deflector member, and the inner surface walls of the casing adjacent the inlet end thereof being tapered to tend to deflect the exhaust gases somewhat uniformly through the screening means adjacent the inlet end of the casing.

6. In combination, a discharge filter for a circuit interrupter including a hollow cylindrical casing member having integrally formed longitudinally extending ribs upon the internal surface thereof adaptable for manual engagement in assembly of the discharge filter, and screening means disposed internally of the cylindrical casing member.

7. A circuit interrupter including means for establishing an arc, a discharge filter chamber for receiving the exhaust arc gases and for cooling and deionizing the same, said discharge filter chamber having a flow-directing nozzle at the inlet end thereof, a nozzle support secured to said flow-directing nozzle and having an inner surface of bowl-shaped configuration, an apertured deflector member disposed adjacent the inlet end of the filter chamber, said apertured deflector member having a cone-shaped deflecting portion pointed upstream of said flow-directing nozzle, a partition-plate portion integrally formed with the casing of said filter chamber and having a central aperture therethrough, first screening means disposed between said partition-plate portion and said apertured deflector member, longitudinally extending support ribs disposed adjacent the exhaust end of the filter casing, a star-shaped deflector member adaptable for insertion into the exhaust end of the filter casing between said support ribs and adaptable for support in recessed portions thereof, second screening means between said star-shaped deflector member and said partition-plate portion, third screening means between said star-shaped deflecting member and the exhaust end of the filter casing, and an apertured closure plate adaptable for securement at the exhaust end of the filter casing.

8. The combination according to claim 7, wherein a positioning pin is inserted within a groove provided in one of the supporting legs and passes through an additional aperture in said star-shaped deflector member.

9. In combination, a discharge filter for a circuit interrupter including a cast filter casing having an integrally-formed apertured partition-plate portion intermediate the ends thereof, screening means on opposite sides of said partition-plate portion, a deflector element having a cone-shaped portion on the opposite side of one of said screening sections with the cone-shaped portion thereof pointing upstream with relation to the exhaust gases, the inner walls of the filter casing being tapered toward said partition-plate portion to somewhat uniformly direct the exhaust arc gases into the last-mentioned screening means, and an apertured closure plate disposed adjacent the exhaust end of the filter casing and adaptable for securement thereto.

10. The combination according to claim 9, wherein longitudinally-extending support legs are integrally formed with the filter casing adjacent the exhaust end thereof and a star-shaped deflector plate is adaptable for insertion between the support legs and for resting in recessed portions thereof.

11. A discharge filter adapted to receive the exhaust arc gases from a circuit interrupter comprising a hollow, cylindrical casing having an inlet at one end for directing the gases into the filter adjacent to the inner walls of the casing, two or more spaced partition plates disposed inside the casing intermediate the ends of the casing, each of the partition plates having one or more openings to permit the arc gases to pass through, screening means disposed inside the casing on the opposite sides of each partition plate, the inner walls of the casing between the inlet and the adjacent partition plate being tapered toward the adjacent partition plate to somewhat uniformly direct the exhaust arc gases generally radially inwardly into the adjacent screening means, and an end closure plate having one or more openings therethrough secured to the other end of the casing, the openings in the partition plates being disposed out of alignment with the openings in the adjacent partition and end closure plates on the opposite sides of each partition plate to permit the arc gases to flow through the filter only through the screening means.

12. A discharge filter adapted to receive the exhaust arc gases from a circuit interrupter comprising a hollow, cylindrical casing having an inlet at one end for directing the gases into the filter adjacent to the inner walls of the casing, two or more spaced partition plates disposed inside the casing intermediate the ends of the casing, each of the partition plates having one or more openings to permit the arc gases to pass through, screening means disposed inside the casing on the opposite sides of each partition plate, the inner walls of the casing between the inlet and the adjacent partition plate being tapered toward the adjacent partition plate to somewhat uniformly direct the exhaust arc gases generally radially inward into the adjacent screening means, and an end closure plate having one or more openings therethrough secured to the other end of the casing, the openings in partition plates being disposed out of alignment with the openings in the adjacent partition and end closure plates on the opposite sides of each partition plate to permit the arc gases to flow through the filter only through the screening means, the screening means adjacent to the inlet of the casing being of a relatively heavier gauge and the other screening means being of a progressively decreasing gauge in a direction away from the inlet of the casing.

13. A discharge filter adapted to receive the exhaust arc gases from a circuit interrupter comprising a hollow, cylindrical casing having an inlet at one end, flow-directing nozzle means disposed at the inlet of the casing for directing the exhaust arc gases into the filter adjacent to the inner walls of the casing, two or more spaced partition plates disposed inside the casing intermediate the ends of the casing, each of the partition plates having one or more openings to permit the arc gases to pass through, screening means disposed inside the casing on the opposite sides of each partition plate, the inner walls of the casing between the inlet and the adjacent partition plate being tapered toward the adjacent partition plate to somewhat uniformly direct the exhaust arc gases generally radially inwardly into the adjacent screening means, and an end closure plate having one or more openings therethrough secured to the other end of the casing, the openings in the partition plates being disposed out of alignment with the openings in the adjacent partition and end closure plates on the opposite sides of each partition plate to permit the arc gases to flow through the filter only through the screening means.

14. The combination as claimed in claim 7 wherein the first screening means is of a relatively heavier gauge and the other screening means are of a relatively lighter gauge.

15. The combination as claimed in claim 9 wherein the screening means adjacent to the deflector element is of a relatively heavier gauge and the screening means on the opposite side of the partition plate portion is of a relatively lighter gauge.

References Cited by the Examiner

UNITED STATES PATENTS

| | | | |
|---|---|---|---|
| 720,087 | 2/1903 | Van Aller | 200—120 |
| 748,157 | 12/1903 | Bouton | 200—159 |
| 2,017,491 | 10/1935 | Glowacki | 200—131 |
| 2,091,423 | 8/1937 | Triplett | 200—117 |
| 2,223,975 | 12/1940 | Traver | 200—149 |
| 2,393,584 | 1/1946 | Bennett | 200—120 |
| 3,178,537 | 4/1965 | Patterson | 200—120 |

FOREIGN PATENTS

| | | |
|---|---|---|
| 787,348 | 7/1935 | France. |
| 914,756 | 6/1946 | France. |
| 918,431 | 10/1946 | France. |
| 622,970 | 12/1935 | Germany. |

KATHLEEN H. CLAFFY, *Primary Examiner.*

ROBERT S. MACON, *Examiner.*